US006672743B1

(12) United States Patent
Juang

(10) Patent No.: US 6,672,743 B1
(45) Date of Patent: Jan. 6, 2004

(54) LAMPSHADE FRAME STRUCTURE

(76) Inventor: Mei-Ju Juang, No. 2, Alley 5, Lane 37, Shin Shing St, Shulin City (TW)

(*) Notice: Subject to any disclaimer, the term of this patent is extended or adjusted under 35 U.S.C. 154(b) by 0 days.

(21) Appl. No.: 10/224,516

(22) Filed: Aug. 21, 2002

(51) Int. Cl.[7] ............................ F21V 11/00; F21V 7/04; G02B 5/02; H01J 5/16; H01P 5/00

(52) U.S. Cl. ....................... 362/358; 362/352; 362/357; 362/450

(58) Field of Search ................................ 362/352, 351, 362/255, 278, 358, 357, 450

(56) References Cited

U.S. PATENT DOCUMENTS 1,867,562 A * 7/1932 Burke ........................ 362/352
4,383,291 A * 5/1983 Gall ........................... 362/352
5,662,412 A * 9/1997 Glendmyer ................. 362/351

* cited by examiner

*Primary Examiner*—Stephen Husar
*Assistant Examiner*—Sharon Payne
(74) *Attorney, Agent, or Firm*—Bacon & Thomas, PLLC

(57) ABSTRACT

Lampshade frame structure including an outer shade body, an upper and a lower trays and several support rods. The upper tray is made of metal rod having circular cross-section. The lower tray is made of metal rod having rectangular cross-section. The support rod is made of slightly elastic elongated metal strip. Each of two ends of the support rod is enclosed in a fixing sheath. One end of an upper fixing sheath is formed with a semicircular holding section, while one end of a lower fixing sheath is formed with a hooking section for respectively hooking and connecting with the upper and lower trays.

1 Claim, 6 Drawing Sheets

LAMPSHADE FRAME STRUCTURE

BACKGROUND OF THE INVENTION

The present invention is related to a lampshade frame structure which can be elastically assembled and disassembled by a user. The appearance of the lampshade is beautified and the storage and transfer of the lampshade are facilitated so as to lower cost.

The existent lampshades have common shortcomings as follows:

1. The frame structure of the conventional lampshade is integrally made by welding. Such frame structure cannot be disassembled so that when it is desired to change the pattern of the lampshade, a user must purchase another one. This is not economic.
2. The conventional lampshades have substantially unified frame structures without novel style.
3. The conventional lampshade is composed of an integrally made frame structure and a shade sheet made of fabric or paper material. Such lampshade has a considerably large volume and will occupy much room. This leads to difficulty in storage and transfer. Also, the number of the transferred lampshades at one time is greatly reduced so that the transferring cost will be increased.

SUMMARY OF THE INVENTION

It is therefore a primary object of the present invention to provide a knockdown lampshade frame structure which can be easily assembled/disassembled. The frame body of the lampshade can be conveniently assembled simply by means of hooking. After assembled, the frame body is enclosed and hidden in the outer shade body. Therefore, the appearance of the lampshade is improved. The rigidity of the lampshade will not be affected. After disassembled, the total volume of the frame body is greatly reduced to facilitate storage and transfer and avoid waste of space and lower the cost for transfer.

The present invention can be best understood through the following description and accompanying drawings wherein:

DETAILED DESCRIPTION OF THE PREFERRED EMBODIMENT

Figure 1:
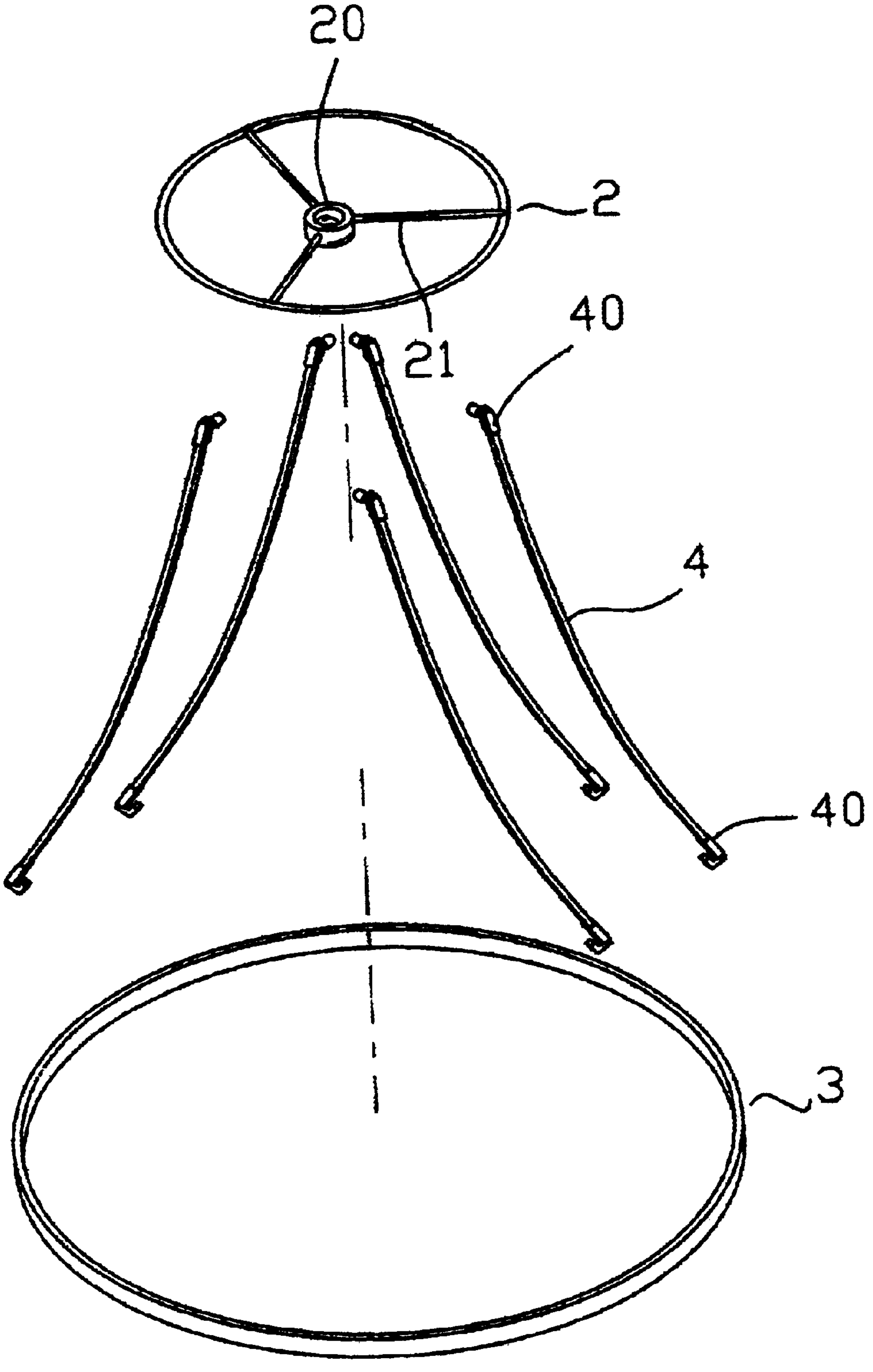
FIG. 1 is a perspective exploded view of the frame body of the lampshade of the present invention.
Figure 2:
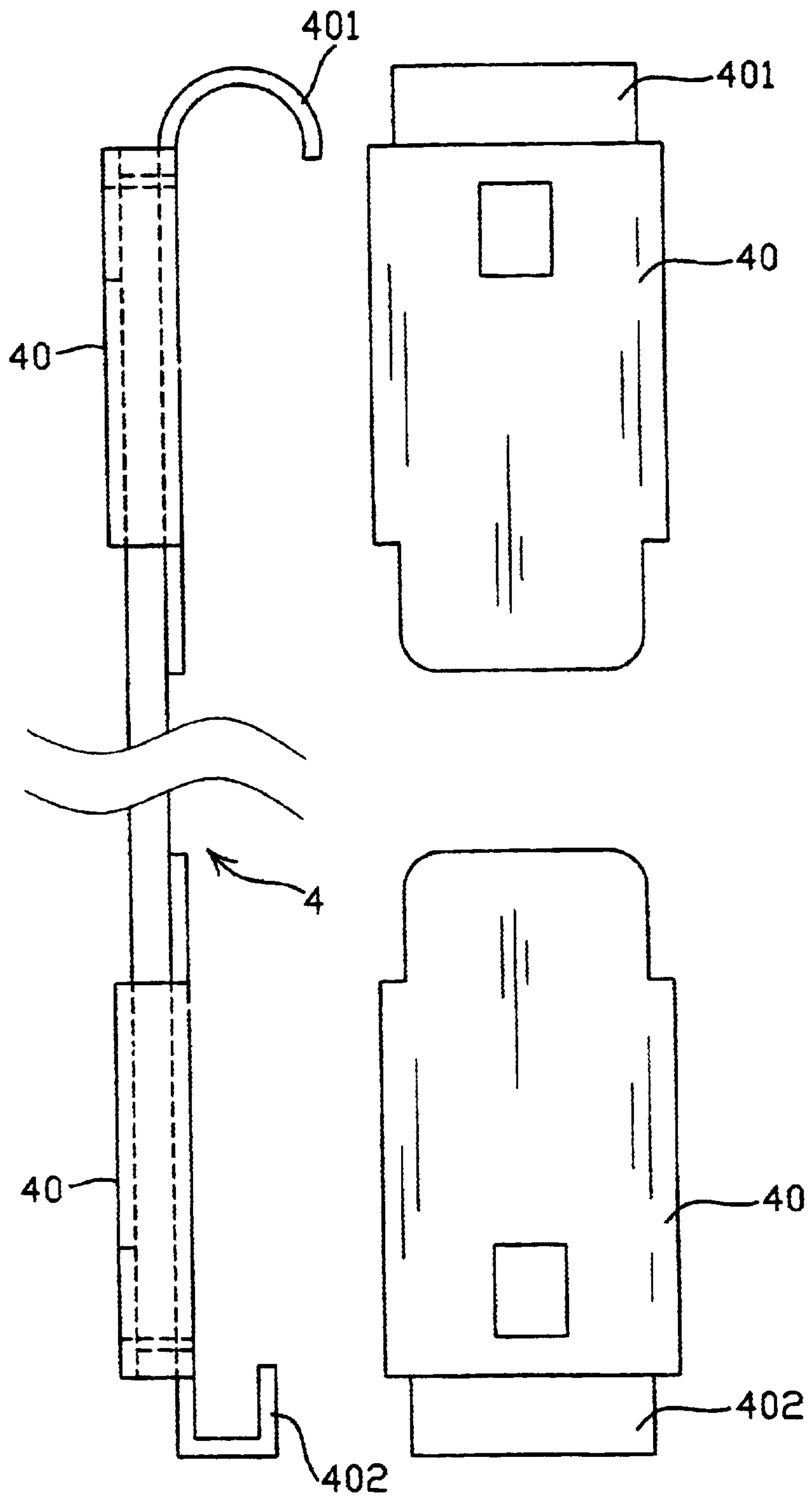
FIG. 2 shows a part of the frame structure of the lampshade of the present invention.
Figure 3:
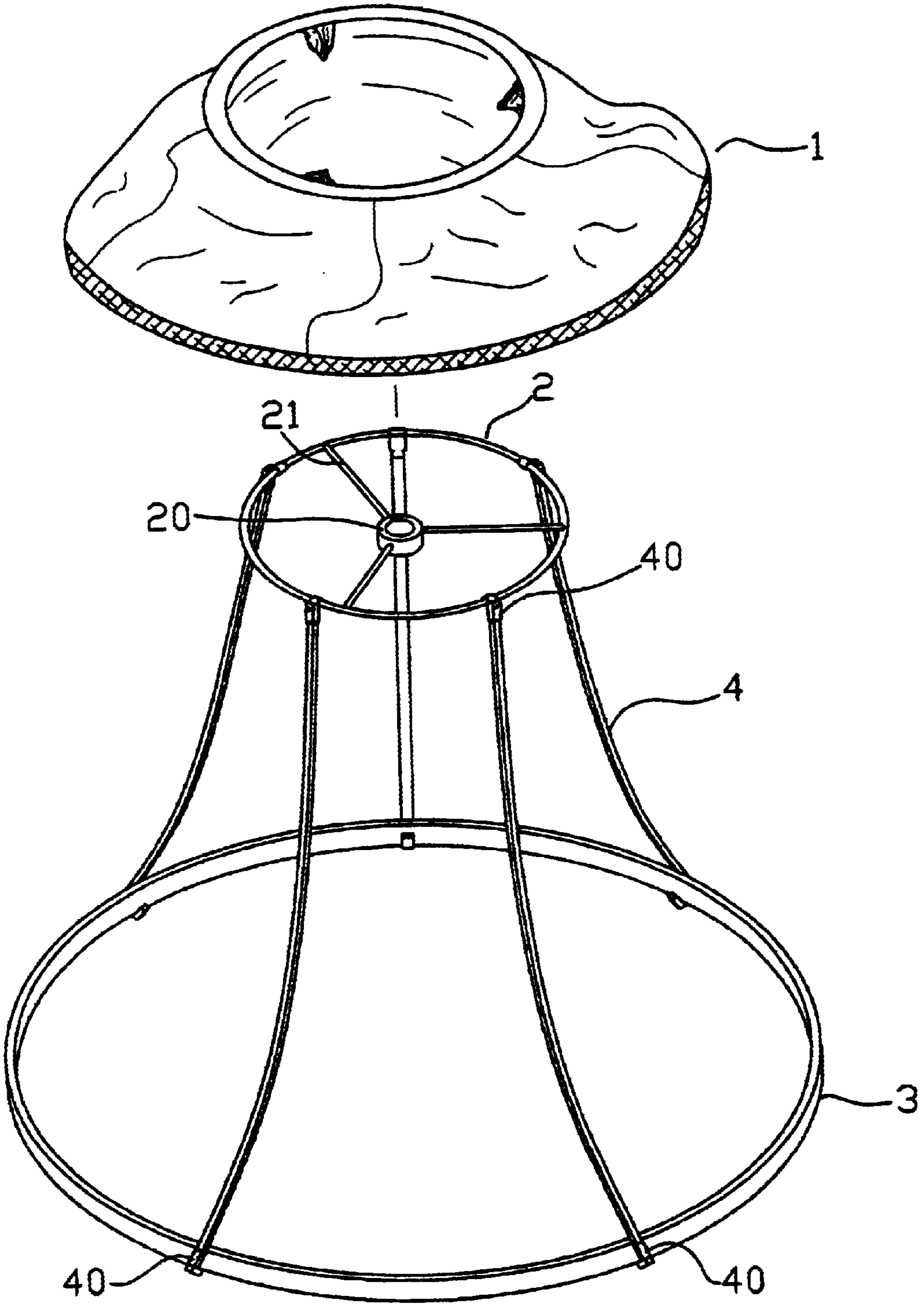
FIG. 3 is a perspective exploded view of the lampshade of the present invention in which the shade body and frame body are separated.

Please refer to FIGS. 1 to 3. The lampshade of the present invention includes an outer shade body 1, an upper and a lower trays 2, 3 and several support rods 4.

The outer shade body 1 has a conic shape and is integrally composed of an inner and an outer layers of fabrics. The shade body serves to converge light beam.

The upper and lower trays 2, 3 are respectively fixedly bound in the upper and lower openings of the conic shade body 1. The upper tray 2 is smaller and is made of metal rod having circular cross-section. A bulb holder 20 is disposed at the center of the upper tray 2. Three connecting rods 21 project from the circumference of the bulb holder 20 at equal intervals to connect with the upper tray 2. The lower tray 3 is larger and is made of metal rod having rectangular cross-section. The upper and lower trays 2, 3 are connected with the support rods 4 to form the frame structure of the lampshade.

Referring to FIG. 2, the support rod 4 is made of slightly elastic elongated metal strip. Each of two ends of the support rod 4 is enclosed in a fixing sheath 40. One end of an upper fixing sheath 40 is formed with a semicircular holding section 401, while one end of a lower fixing sheath 40 is formed with a hooking section 402 for respectively hooking and connecting with the upper and lower trays 2, 3.

Figure 4:
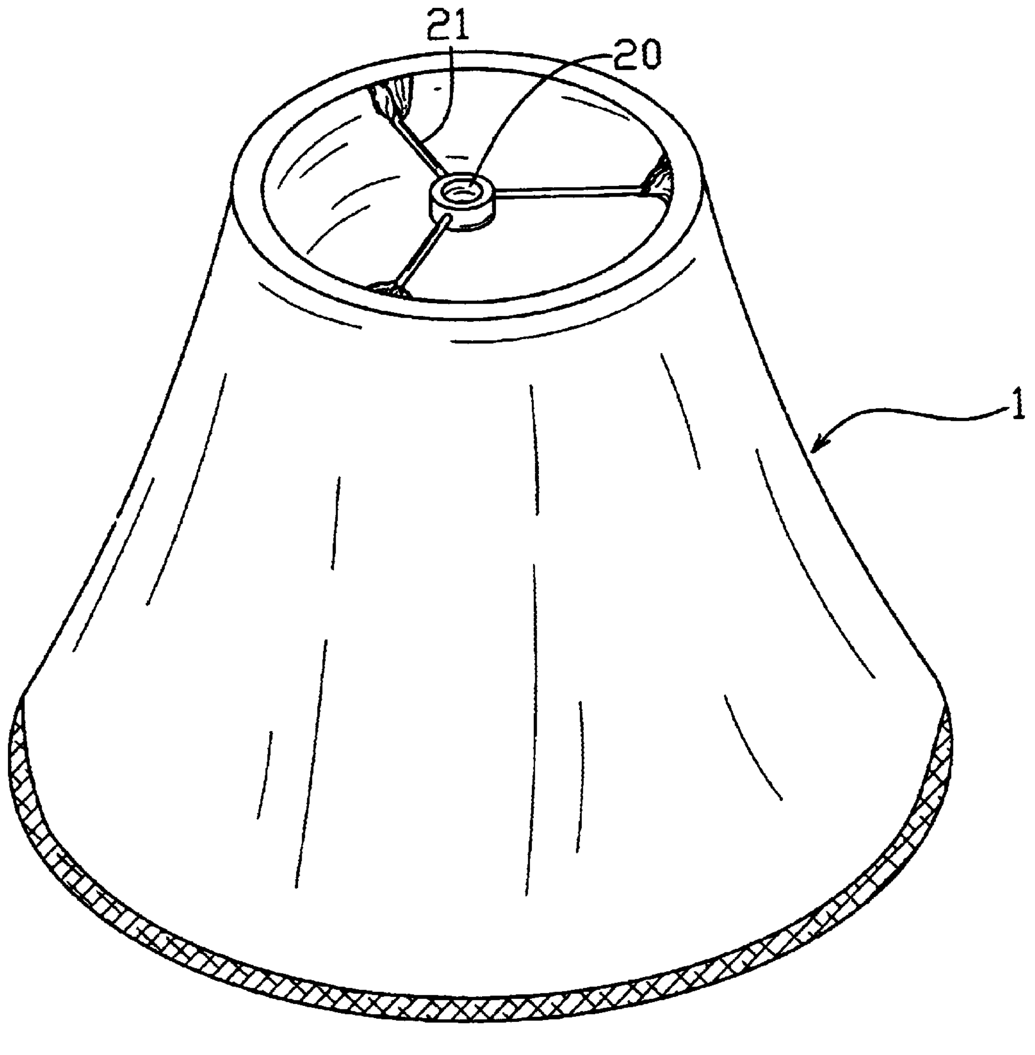
FIG. 4 is a perspective view of the lampshade of the present invention.
Figure 5:
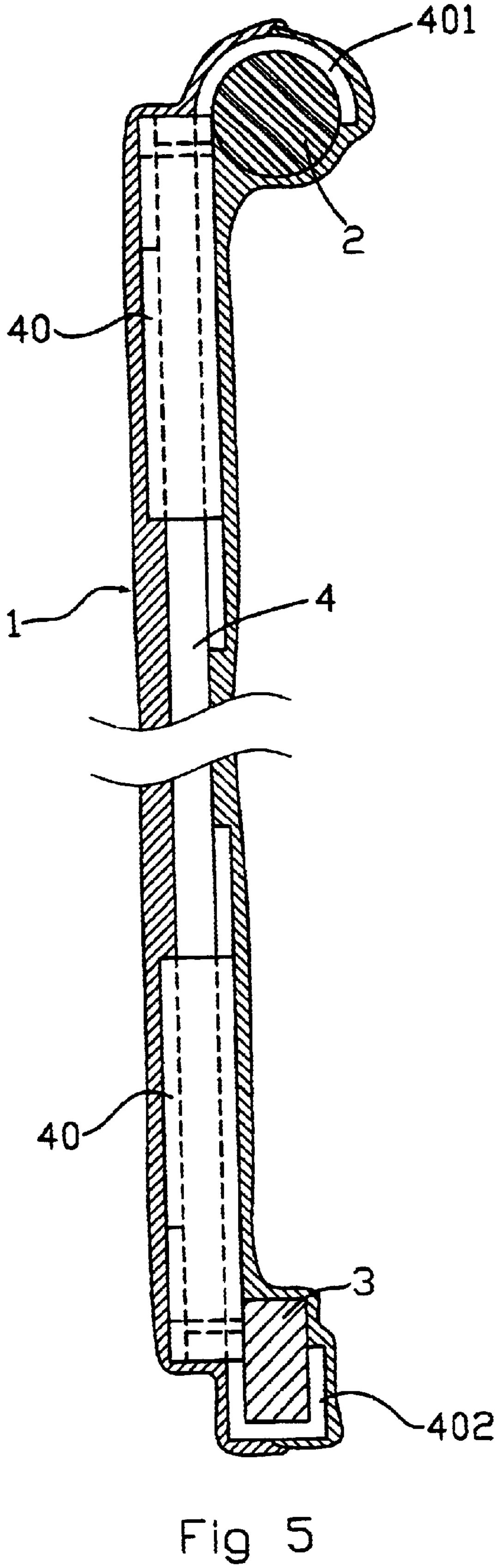
FIG. 5 is a sectional view of the present invention.

When assembled, the upper and lower trays 2, 3 are connected with several support rods 4. The holding sections 401 of the upper fixing sheaths 40 of the support rods 4 are fixedly hooked on the upper tray 2 made of circular metal rod at equal intervals. The hooking sections 402 of the lower fixing sheaths 40 of the support rods 4 are fixedly hooked on the lower tray 3 made of rectangular metal rod at equal intervals. Then, the inner and outer layers of fabrics are respectively laid on inner and outer faces of the frame body to form the shade body 1 to complete the lampshade as shown in FIGS. 4 and 5.

The above components can be freely DIY assembled/disassembled and replaced by a user. The upper and lower trays 2, 3 and the support rods 4 are all enclosed and hidden in the shade body 1 without being exposed to outer side. Therefore, the appearance of the lampshade is beautified.

Figure 6:
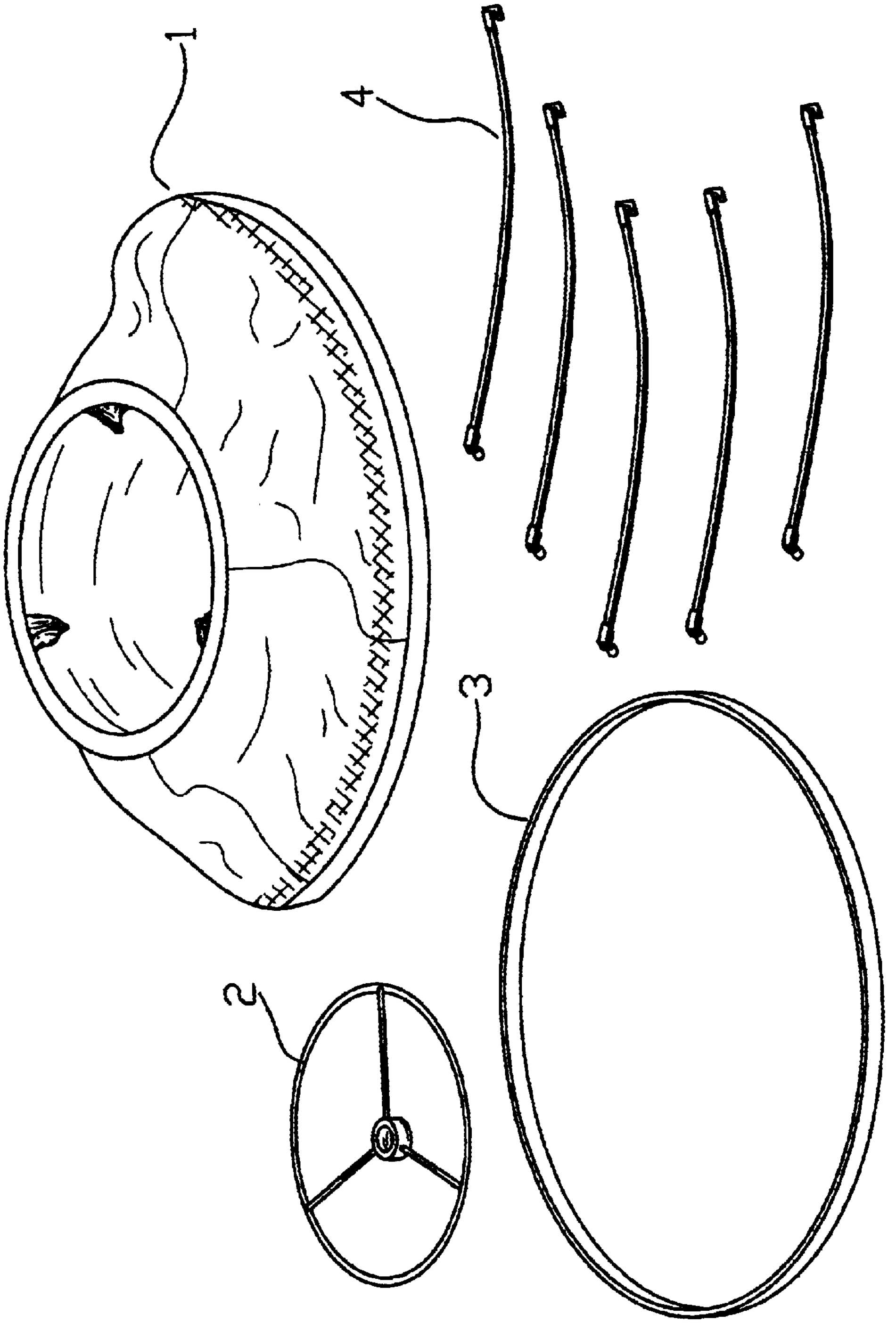
FIG. 6 is a perspective exploded view of the present invention.

Referring to FIG. 6, the outer shade body 1, upper and lower trays 2, 3 and the support rods 4 of the lampshade are all independent components. When not used, these components can be disassembled and collectively stored so as to minimize the volume of the lampshade. In the case of mass-production, the components are respectively collectively stored to avoid waste of storage room. Also, it is convenient to transfer the products and the transfer cost is lowered. Moreover, the support rods 4 are connected with the upper and lower trays 2, 3 by means of hooking measures so that it is easy to assemble these components. These components are all made of metal material so that the frame structure is rigid and durable.

According to the above arrangement, the present invention has the following advantages:

1. The upper and lower trays are connected with the support rods to form the frame body. The upper and lower trays and the support rods are all enclosed and hidden in the inner and outer fabrics of the shade body without being exposed to outer side. Therefore, the appearance of the lampshade is beautified. The components can be freely replaced by a user as desired to change the appearance of the lampshade. Therefore, the cost for purchasing another lampshade is save.
2. The above components are detachably connected with each other so that a user can freely DIY assemble/disassemble the components. After disassembly, the volume of the lampshade is minimized to facilitate storage and transfer.

The above embodiment is only used to illustrate the present invention, not intended to limit the scope thereof. Many modifications of the above embodiment can be made without departing from the spirit of the present invention.

What is claimed is:

1. Lampshade frame structure comprising an outer shade body, an upper tray and a lower tray and a plurality of support rods, the outer shade body having a conic shape and being integrally composed of an inner layer and an outer layer of fabrics, the upper and lower trays being respectively fixedly bound in an upper opening and a lower opening of the conic shade body, the upper tray being smaller and made of a first metal rod having circular cross-section, a bulb holder being disposed at the center of the upper tray, a plurality of connecting rods projecting from the circumference of the bulb holder at equal intervals to connect with the upper tray, the lower tray being larger and made of a second metal rod having rectangular cross-section, said lampshade frame structure being characterized in that the support rod is made of slightly elastic elongated metal strip, each of two ends of the support rod being enclosed in a fixing sheath, one end of an upper fixing sheath being formed with a semicircular holding section, while one end of a lower fixing sheath being formed with a hooking section for respectively hooking and connecting with the upper and lower trays.

* * * * *